INVENTOR.
John W. Payne
BY
Charles A. Huggett
Attorney

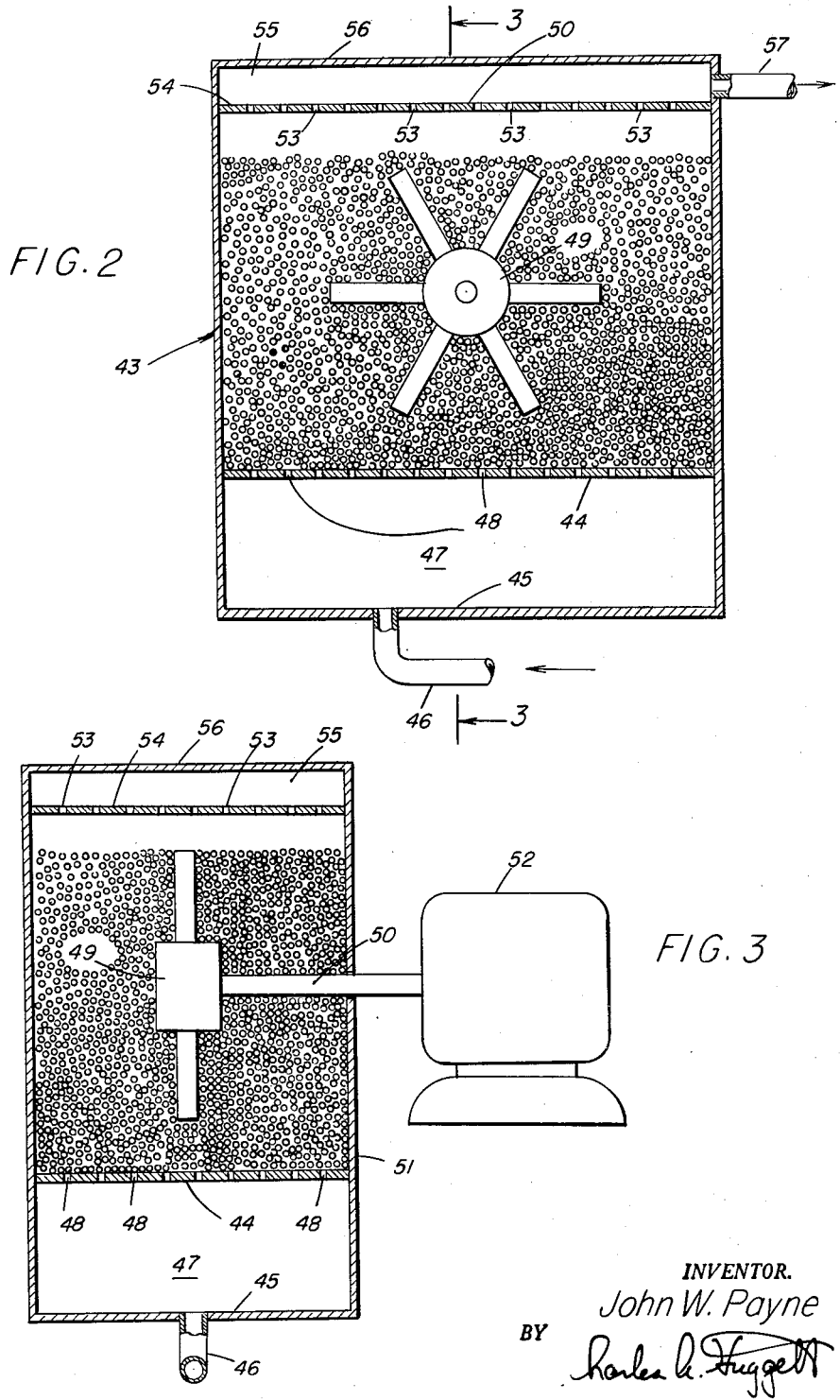

United States Patent Office 3,060,117
Patented Oct. 23, 1962

3,060,117
RESTORATION OF CATALYST BY
SURFACE GRINDING
John W. Payne, Woodbury, N.J., assignor to Socony
Mobil Oil Company, Inc., a corporation of New York
Filed Nov. 9, 1959, Ser. No. 851,870
5 Claims. (Cl. 208—165)

This invention relates to catalytic cracking systems in which a cracking catalyst is contacted with hydrocarbons to effect conversion and is particularly concerned with maintaining the catalyst particles free of metal contaminants in the petroleum hydrocarbons undergoing treatment deposit on the catalyst and have a harmful effect on the cracking reaction.

Practically all petroleum refineries have cracking units in which a portion of the heavier distillate is charged to the unit to increase the amount of gasoline and light fuel oil produced from each barrel of crude oil. A popular system is the TCC system in which a granular catalyst of about 4–12 mesh Tyler size is gravitated as a compact mass through reaction and regeneration zones. In the reactor the catalyst is contacted with the petroleum oil heated to provide at least a high volume of vapor and the conversion takes place during transfer through the voids in the bed. Carbonaceous deposits are produced on the catalyst during reaction and hence spent catalyst is continuously transferred to the regenerator and brought into contact with a large volume of air. The contaminant is burned from the catalyst whereby the catalyst is largely restored in activity.

Certain metals, such as iron, chromium, nickel and vanadium, are picked up by the catalyst during usage in the system, primarily from the hydrocarbon charge. These metal contaminants are not removed during the normal regeneration and tend to accumulate to a high level on the catalyst. These metal impurities tend to produce more gas and coke during the cracking reaction and cause less gasoline to be produced. For example, it is reported (Oil & Gas Journal, vol. 57, No. 29, July 13, 1959, at page 133), that for a fluid cracking catalyst the sum of the p.p.m. (parts per million) of iron plus 4 times the p.p.m. of copper, plus 2 times the p.p.m. of vanadium, plus 9.2 times the p.p.m. of nickel in the hydrocarbon charged to the unit should not exceed about 4.0. Thus an oil that contains 1.0 p.p.m. iron, 0.1 p.p.m. copper, 0.5 p.p.m. vanadium, and 0.3 p.p.m. nickel would give a total of about 5.2 and this woud indicate rapid contamination of fluid-type catalyst. Somewhat larger amounts of contaminants can be tolerated in moving bed catalytic systems, such as the TCC system, but in this case the nickel content of the catalyst should not exceed 100 p.p.m. and preferably should not exceed about 60 p.p.m. without adversely affecting the yield of the desired products.

It has been known that the metal contaminants concentrate on the outer surface or skin of the catalyst particles and that by removing the outer surface of the catalyst, the catalyst could be restored to its normal condition. This surface concentration has been considered to be in a layer having a depth of 40–100 microns and that, therefore, the removal of a layer of that depth would be required to restore the catalyst. Various techniques have been proposed for removing the surface layer of the metal contaminated catalyst, such as the use of an abrasive particle carried concurrently with the catalyst in a stream of gas, as disclosed in U.S. Patent No. 2,892,771. The U.S. Patent No. 2,421,212 proposes removing particles below 20 micron size from a fluidized system to maintain higher average cracking ability. The U.S. Patent No. 2,651,600 proposes injecting streams of fluid into a fluidized catalyst system to provide increased attrition followed by removal of particles less than 40 microns in size to effect removal of metal contaminated catalyst. These systems have not been entirely satisfactory, however, since they require the removal of an excessive amount of catalyst to retain metal contamination to desired low levels and furthermore involve an excessive amount of breakage of the catalyst particles which results in nonselective removal of catalyst from the system.

I have found that, contrary to prior belief, the major concentration of the metal contaminants are located on a layer at most no more than about 10 microns deep and largely less than about 5 microns deep. What is required is a method and means of removing a layer not 20, 40 or 60 microns deep but actually a layer not over about 10 microns deep and generally not more than about 5 microns deep.

It is an object of this invention to provide a method and means of removing from a metal contaminated catalyst a fine outer layer of material containing a large proportion of the metal contaminants without removing any substantial amount of the uncontaminated catalyst.

It is a further object of this invention to provide a method and means for removing from the metal contaminated catalyst of a cracking system the outer layer of the catalyst to a controlled depth required to remove a large proportion of the metal contaminants without substantial catalyst loss.

It is a further object of this invention to subject catalyst containing contaminant metals to a reconditioning treatment to effectively reduce the metal content without substantial catalyst loss.

It is a further object of this invention to provide a method and means of removing a layer of surface catalyst from a cracking catalyst in the form of dust of a particle size not greater than 2 microns.

It is a further object of this invention to provide a method and apparatus for removing a surface layer of cracking catalyst from particle-form cracking catalyst contaminated with metals as a dust of a particle size less than about 1 micron diameter.

One aspect of this invention involves the transfer of metal contaminated catalyst particles to a reconditioning zone in which the particles are maintained in the form of a bed in substantial touching contact but maintained substantially weightless by the upward transfer of a gas or vapor through the mass. Mechanical movement is provided in the mass to effect light continuous moving contact of one particle against other particles at a rate high enough to provide removal of particles of a size at least less than about 2 microns and primarily less than 1 micron in size. Reconditioned particles are removed from the reconditioning zone.

The invention will be disclosed more fully in the following detailed discussion as well as in the attached figures which are referred to in this discussion.

FIGURE 2 shows a vertical view in section of the stirring apparatus of this invention.

FIGURE 3 shows a vertical view in section as seen on plane 3—3 of FIGURE 2.

Figure 1:
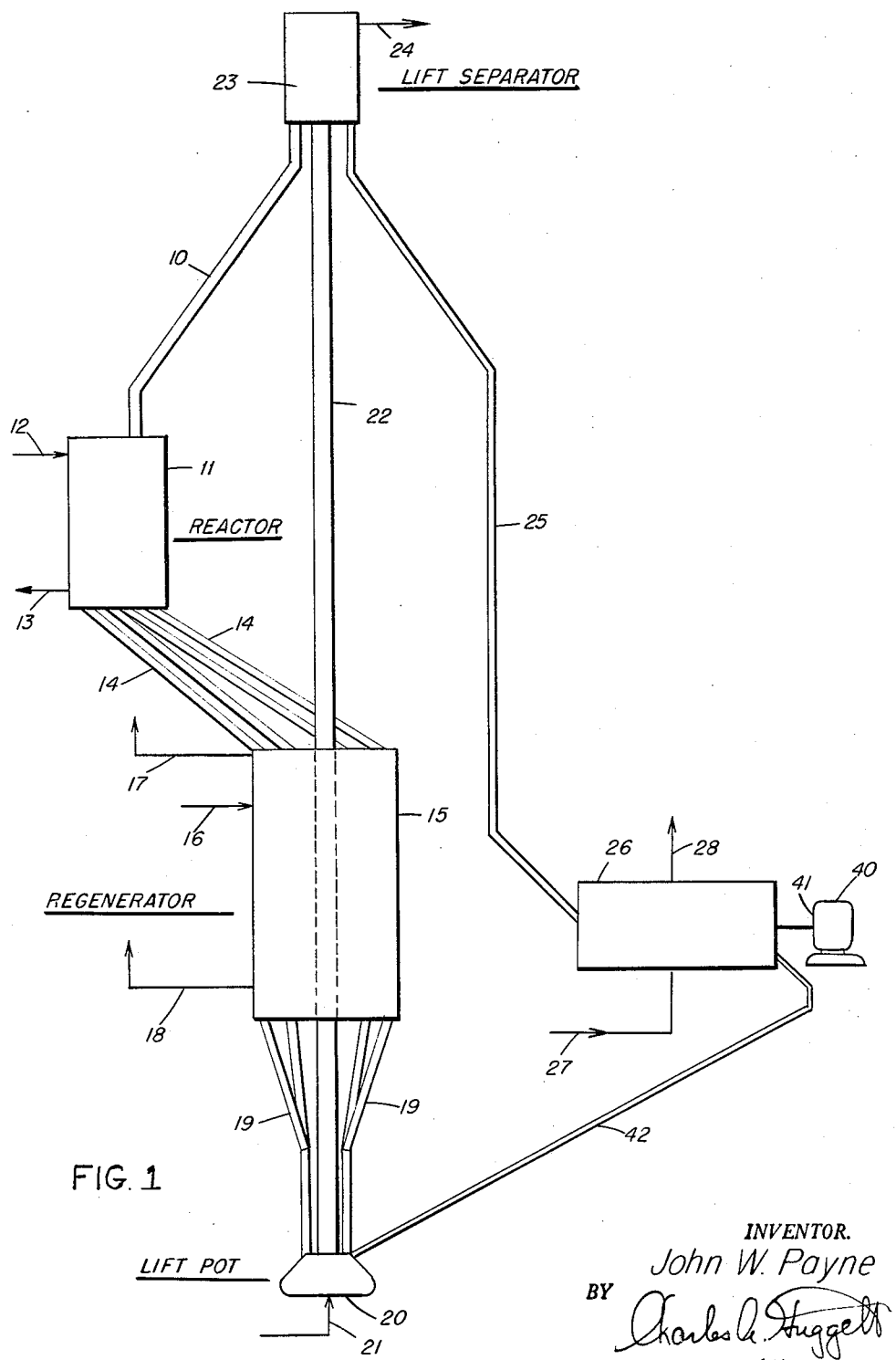
FIGURE 1 shows a complete moving bed hydrocarbon conversion system in which the invention is incorporated.

Referring now to FIGURE 1, the catalyst is gravitated as a compact column through the conduit 10 into the reactor 11 and travels as a compact gravitating bed through the reactor in contact with the hydrocarbons undergoing reaction. These hydrocarbons are prepared for treatment and introduced into the reactor through conduit 12. The products are removed through the conduit 13 to further processing apparatus not shown. The temperature in the reactor is normally about 900–1000° F. and the pressure about 10–20 p.s.i. (gauge). The catalyst accumulates a carbonaceous deposit and this spent catalyst is transferred through the conduits 14 to the regenerator 15.

The catalyst gravitates as a compact mass through the regenerator 15 in which it contacts air which burns the carbonaceous material on the catalyst. The air is introduced into the regenerator through the conduit 16 and is removed as flue gas through the conduits 17 and 18. The temperature in the regenerator ranges between about 1000–1400° F. and the pressure is usually about atmospheric pressure.

The regenerated catalyst is gravitated as compact streams through the conduits 19 into the lift pot 20. The catalyst contacts a stream of lift gas introduced into the lift pot through the conduit 21 and passes upwardly through the lift pipe 22 as a dilute phase flowing stream to the separator 23. The lift gas is discharged from the separator 23 through the conduit 24 and the separated catalyst is primarily returned to the reactor 11 through the conduit 10.

Various contaminating metals, such as nickel and vanadium, are introduced with the oil charge and deposit on the catalyst in the reactor 11. These metals are not removed by the combustion in the regenerator 15 and hence they build up to high levels of concentration on the catalyst provided the catalyst remains in the system for a sufficient number of cycles. Early moving bed systems and catalyst used in these systems caused a certain amount of attrition damage to the catalyst, both in the catalytic section and in the lift section, which kept the metals content on the catalyst from building up to too high a level. In recent years gradual improvement of the system and catalyst have made it possible for the catalyst to remain in the system so long in undamaged condition that excessive levels of metal contamination are reached. This has necessitated removal of large amounts of usable catalyst with replacement of this catalyst with fresh catalyst or to restrict the amount of heavy stocks which can be charged to the reactors to maintain the metals content on the catalyst below safe operating limits. This is an exceedingly expensive and wasteful procedure. Such hardened catalyst particles are fully disclosed in U.S. Patent No. 2,900,349.

In this invention a side stream of the catalyst is taken from the separator 23 through the conduit 25 to a reconditioner 26. Gas is introduced into the reconditioner 26 from the conduit 27 and gas and fine particles are removed through conduit 28. The gas flow is adjusted to just remove the weight effect from the catalyst in the reconditioner 26 while maintaining the reconditioner nearly full of catalyst as a homogeneous mass. This permits catalyst movement readily but in constant contact with other catalyst particles. A motor 40 is connected to a shaft 41 and this rotates a mechanical agitator in the reconditioner 26 so that the catalyst particles are brought into continuous moving contact with each other to effect removal of exceedingly small particles of catalyst from the surface of the catalyst particles. These particles are so fine that they readily escape with the supporting gas through the exit conduits. The rotating agitator must insure that substantially the entire mass of particles is in constant motion and continually renew the point of contact with other particles. For practical application the particles must make a great many contacts per unit of time with each other. The reconditioned catalyst is withdrawn through the conduit 42 and returned to the lift pot 20 for reuse in the process.

In order to establish the optimum amount of surface to be removed, in removing metal poison, and thus determine the maximum desirable dust particle size, some experiments were made in which the extreme outer surface of the catalyst particles, or in this instance, catalyst spherical beads, was removed by gently rolling the beads suspended in bottles of naphtha. In these experiments, after the beads were rolled for a specific time, the removed surface material was collected and the beads returned for additional increments of surface removal. The catalyst beads used in these tests were newly developed catalyst beads of unusual hardness and resistance to attrition (such as those disclosed in U.S. Patent No. 2,900,349). These beads had been used in a commercial TCC unit and had accumulated an average nickel concentration of 45 p.p.m. nickel. The maximum nickel concentration was found in the first particles removed to be 7400 p.p.m. This corresponded to a shell thickness of only 0.005 micron or 0.001% weight of the bead. At 0.2 micron shell thickness or 0.04% weight of bead removal, the nickel concentration was found to be about 1500 p.p.m. These values correspond to a ratio of 165:1 at 0.005 micron shell thickness and 33:1 at 0.2 micron shell thickness, as compared with the average nickel content on the catalyst bead. These tedious tests showed that removal of less than a 2½ micron thickness shell of the catalyst would in fact remove a substantial portion of the metal contaminants and hence would be a practical method of restoring the catalyst without substantial catalyst weight loss provided the removal of such a fine layer could be accomplished on a practical basis. These tests were conducted on used catalyst in which the catalyst had been considerably penetrated by metal contaminants. For fresh catalyst, adequate control can be obtained by removing an even thinner layer, since the metals on the fresh catalyst do not penetrate as far into the catalyst. The results shown on curve 4 are for catalyst which had been in commercial service for about one year. In many instances, the removal of a layer about 2½ microns thick for new catalyst will, therefore, be adequate to maintain the catalyst in excellent operating condition.

Careful measurements conducted to determine the energy required to break beads and form new surfaces thereon showed that 5.5 foot pounds per square foot of new surface was required. Using this figure it was determined that 230,000 foot pounds would be required to produce one pound of catalyst dust of one micron size. Translating this to commercial quantities, 1000 pounds of dust per day requires about 5 horsepower input at 100% grinding efficiency. Using 5.5 foot pounds per square foot energy figure for formation of new catalyst surfaces, the energy requirement to produce a one micron particle is $159 \times 10^{-12}$ foot pounds. This energy corresponds to that obtained by dropping a single six mesh bead from a height of about 0.0008 millimeter. Since one pound of one micron dust represents 1.45 million billion particles, or that 420 million particles are produced in removing 0.5% by weight from a single bead, these early experiments showed that a grinding machine to accomplish the desired thin layer removal would have to impart a tremendous number of minute energy inputs to the beads. It was consequently considered necessary to develop a grinding device embodying the principle of limited freedom of movement of the beads, gentle multi-million contact of bead with other beads, and removal of dust as soon as formed so that the dust does not coat the bead surface and prevent further grinding.

I found that a satisfactory grinding mechanism could be provided by mounting a stirring member vertically on a horizontal shaft in a chamber as shown in FIGURES 2 and 3 attached. The chamber 43 may be in the form of a box with a perforated floor 44 adapted to hold the catalyst particles or beads above the bottom 45 of the box. A gas, such as air, is introduced through the conduit 46 into the region 47. The gas distributes uniformly through the apertures 48 in the perforated floor 44, the pressure drop being adjusted to effect uniform gas distribution. The particles are supported by the upward flow of gas, the pressure drop being adjusted to substantially counterbalance the weight of the catalyst in the box. In other words, the pressure drop of air in pounds per square inch is just equivalent to the weight of a column of the beads in the bed having a cross section of one square inch. The upper limitation is that point at which bubbles begin to form in the bed when the stirring mechanism is idle but which disappear when the stirring mechanism is in motion. It is not desirable at a gas flow so high that bubbles still form in the bed after the material is stirred. This effectively makes the catalyst particles weightless and free to move in any direction except for the interference of adjacent particles. By maintaining the mass of catalyst in touching contact, the particles cannot move any substantial distance without rubbing other particles. The stirring wheel 49 is located vertically within the catalyst mass on the horizontal shaft 50. This shaft projects through the wall 51 of the box 43 and is driven at a moderate speed by the motor 52. The speed of the wheel will depend on the size of the wheel, roughness or shape, as related to its ability to maintain the beads in rapid motion. The wheel disclosed has a hub with radial spokes which serve as stirring members when the wheel is rotated. The stirring wheel causes a movement in the catalyst bed, the particles tending to slowly follow the wheel. The particles contact the wheel surface but, what is more important, the particles are caused to make innumerable contacts with each other. The gas flow through the bed is adjusted only to provide a supported bed and in this condition the particles cannot move without rubbing adjacent particles. This movement provides the energy transfer in the limited amount necessary to remove particles of about 1 micron or less. Where the bulk density of the particles is less than a substantially compact bed, such as in a boiling fluidized bed, the energy transfer is too great and catalyst breakage occurs, or at least the particles formed are substantially greater than 1 micron in size. Where the gas flow is less than that required to substantially float the particles, there is increased resistance to movement, excessive particle breakage occurs and the particles formed are substantially greater than 1 micron particles. With the particles just weightless, however, most of the particles formed are about 1 micron or less and these particles are so small that they are entrained in the rising gas and removed with the gas as soon as formed. The gas and fine particles leave through the apertures 53 in the cover plate 54 and are withdrawn from the collection region 55 below the top cover 56 by the conduit 57.

EXAMPLE I

Figure 4:
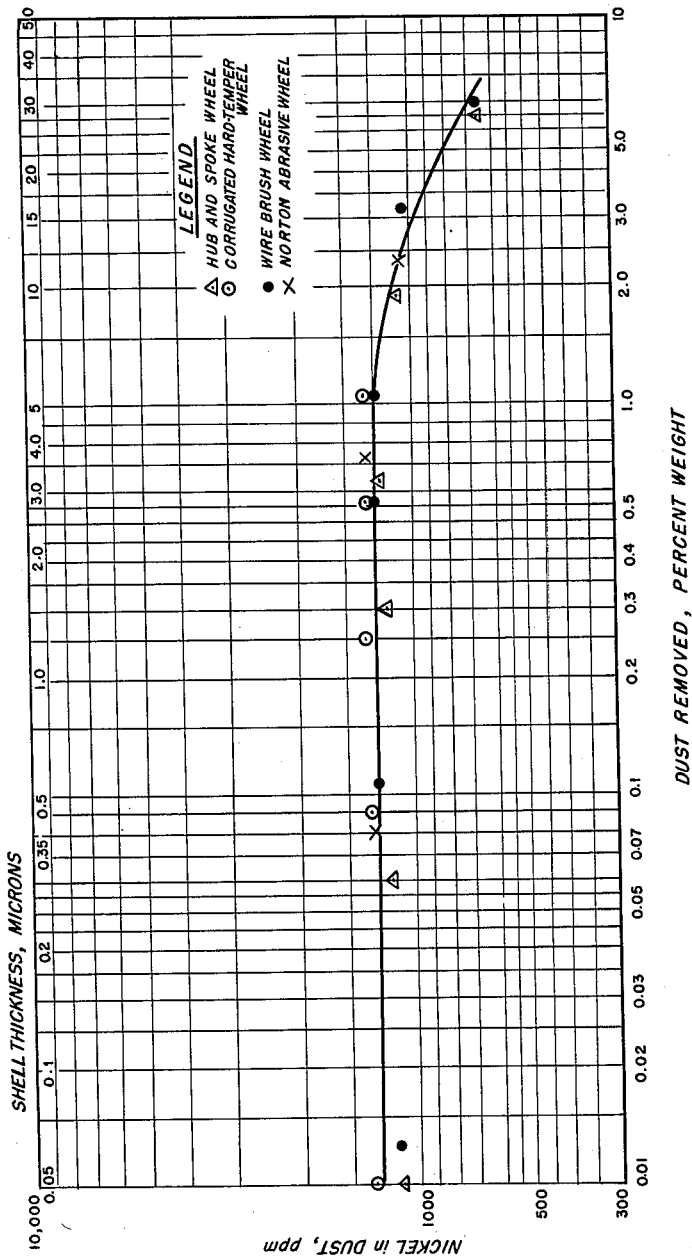
FIGURE 4 shows a plot of nickel in dust removed, p.p.m. versus dust removed (percent weight) and shell thickness (microns).

As an illustration of the invention a box 4" wide, 10" long, and 12" high was filled to within about 2" of the top with catalyst beads. A grinding wheel 4" to 6" in diameter was rotated in a vertical plane located in the center of the box. Air was passed upwardly through the bed of beads at a flow rate just sufficient to counteract the force of gravity and essentially float the beads. The pressure drop of the air was just equivalent to the weight of the column of beads for a unit area in the box. The apparatus was found not particularly sensitive to air flow rate, a value 10% higher or lower than that required to just support the beads being operable. Unusual variation from this weight balancing flow rate was found, however, to be unsatisfactory, producing bead chipping and decreased grinding rate. It was also found that the grinding chamber should be filled by the beads to a level substantially above the top of the wheel to prevent any single particle building up an excessive velocity before contact with other beads or vessel walls. The aim of this invention is accomplished by a great number of very small energy transfers from catalyst bead to catalyst bead per unit of time. Most of these experiments were performed at an air rate yielding slight bubbling in the bed. When the wheel was started, the bubbling disappeared and the beads slowly rotated in the same direction as the wheel, with the beads possessing freedom of movement. Several types of wheels were tested in this apparatus and all gave satisfactory dust particles (0.5-1.5 microns) without chipping the beads. The various wheels also gave about the same concentration of metal poisons in the dust; about 10 to 12 times that of the original beads. This concentration ratio is higher in a continuous system, through which the beads flow uniformly, as compared with the batch system described hereinabove. The data from these tests is shown in the attached FIGURE 4, being a plot of nickel concentration in the dust in p.p.m. versus the dust removed as per cent weight of the catalyst beads and shell thickness removed in microns. The grinding wheels tested were:

(1) A high density silicon carbide wheel impregnated with epoxy resin.

(2) A tungsten carbide grit wheel bonded with epoxy resin.

(3) A boron carbide grit wheel bonded with epoxy resin.

(4) A steel grit wheel, hard tempered, and bonded with epoxy resin.

(5) A wire brush wheel of 6" diameter fitted with 5½ in. diameter soft iron side plate.

(6) A corrugated steel wheel, hard tempered, with concentric corrugations (66 Rockwell C).

(7) A soft iron wheel, made of 5½ in. diameter disc sheared from a 16 gauge black iron sheet (60 Rockwell B).

(8) A soft aluminum wheel, made of 5½ in. diameter disc sheared from 16 gauge aluminum sheet.

(9) A hub and spoke wheel formed of two rows in staggered arrangement of solid radially extending steel spokes set in the wheel hub. The spokes were hard tempered (63 Rockwell C) and were arranged 6 in each row.

The performance of these wheels is shown in the following Table I:

*Table I*

PERFORMANCES OF VARIOUS GRINDING WHEELS (STIRRING DEVICES)

| Type of wheel | Wheel dia., inches | R.p.m. | Grinding rate, lbs. per day per ft² of grinding surface | Pounds of dust produced per pound of wheel loss | Remarks |
|---|---|---|---|---|---|
| Silicon carbide epoxy resin impregnated | 6 | 1,250 | 13 | 210 | Steel rims on wheel to prevent chipping. |
| Tungsten carbide grit bonded with epoxy resin | 4 | 2,460 | 33 | 450 | Grit appeared to crumble rather than wear. |
| Boron carbide grit bonded with epoxy resin | 4 | 3,550 | 13 | 20 | Grit appeared to be brittle. |
| Steel grit bonded with epoxy resin | 4 | 2,460 | 16 | 400 | Grit developed polished surface. |
| Wire brush wheel with side plates | 6 | 1,240 | 23 | 340 | These results are based on peripheral area. |
| Corrugated hard-temper steel wheel | 4 | 2,470 | 7 | 550 | Corrugation ridges developed polished surface. |
| Soft iron disc | 5½ | 2,450 | 15 | 28 | Disc developed a 4 micron roughness. |
| Soft aluminum disc | 5½ | 2,440 | 30 | 10 | Disc developed radial wear grooves. |
| Hub and spokes, hard-temper steel spokes | 5 | 1,250 | 163 | 7,500 | Spokes acquired highly polished surface. |

From this Table I it can be seen that the grinding rate varied considerably for the different wheels. The grinding rate could have been made the same for the different wheels by adjusting the speeds of rotation. It is seen that there was an extremley wide difference in the amount of dust produced per pound of wheel loss. Wheels constructed of hardened steels, particularly the hub and spoke wheel, gave very high dust makes per pound of wheel loss, whereas wheels constructed of commercial grinding materials were less satisfactory, but nevertheless acceptable. While the soft iron wheels wore rapidly, the rapid wear is largely offset by the low cost of those wheels as compared to the hardened steel or commercial grinding materials. While the invention has been disclosed by the use of stirring wheels mounted in a vertical plane on a horizontal axis, good results can also be obtained with the stirring device mounted in other than a vertical plane.

As the r.p.m. of the grinding wheel is increased the amount of dust produced is increased but generally this is obtained at a reduced amount of dust per pound of wheel lost. Tests conducted at different r.p.m. using the apparatus described hereinabove are reported in Table II as follows:

*Table II*

| Wheel | R.p.m. | Grinding rate, grams per hour | Weight of dust per weight of wheel loss |
| --- | --- | --- | --- |
| Silicon carbide wheel | 660 | 29 | 74 |
|  | 1,270 | 73 | 32 |
| Tungsten carbide with epoxy resin | 1,275 | 28 | 820 |
|  | 2,440 | 149 | 495 |
|  | 4,271 | 415 | 177 |
| Soft iron wheel | 1,270 | 45 | 28 |
|  | 2,450 | 80 | 29 |

Catalyst beads take up moisture when in contact with atmospheric air in amounts of about 1–5% of the weight of the beads. The catalyst particles lose this moisture when heated to high levels. In order to test the effect of moisture on grinding the surface of catalyst beads, tests were conducted using beads dried at about 900° F. The results showed that drying the beads prior to grinding the surface did not affect either the grinding rate of the beads or the ratio of dust produced to the weight of wheel loss.

The grinding efficiencies of the different types of grinding wheels tested were determined and the particle size was calculated and observed in actual test, both optically and by use of the electron microscope. These results have been tabulated in Table III as follows:

micron diameter. The energy input to the grinding wheels is seen to range from about 400,000 foot pounds per pound of dust for the hub and spoke wheel to about 1,500,000 foot pounds per pound of dust for the wire brush wheel and soft iron disc wheel. These energy inputs correspond to a 10 to 30 horsepower machine to make 1,000 pounds of dust per day.

While a single grinding wheel has been shown to be used in demonstrating the invention it is obvious that several wheels in parallel can be used successfully and that these would provide the increased capacity desired in large operations. Such an arrangement is contemplated as within the scope of this invention. In a commercial application of the invention a few tons per hour of the catalyst beads are passed through a grinding zone as a slip stream from the main catalyst stream to continuously remove no more than about one percent and generally up to about one-half of one percent weight of the beads as dust of a particle size at least less than 2 micron diameter and preferably less than 1 micron diameter. The grinder may suitably be a box of about 10 to 20 sq. ft. cross section with a shaft extending through the box and carrying a gang of grinding wheels. The catalyst beads are introduced at one end of the box and removed from the other end for return to the main cyclic catalyst stream. Gas introduced to the bottom of the box is at a controlled flow rate to just float the beads without excessive agitation and the gas and dust formed is removed to a scrubber to prevent atmospheric pollution. Of course, where dust discharge is not a problem, the gas and dust may be discharged to the atmosphere.

While the invention has been disclosed with respect to removing the metal poisons from the surface of catalyst particles of the size used in the moving bed TCC system, it is not intended that the invention be restricted to this use. This invention has broad application to removing thin surface layers from any types of particles and is therefore useful in removing surface layers from catalyst of the fluid type. The invention can be used to grind ball bearings, there being no limit on the size of particle or density of particle undergoing treatment. Irregular particles are rounded by treatment according to this invention. Even if the material being treated is soft, the invention can still be used because the material is not treated roughly. Hence a polishing treatment can be given pearls or similar articles by this invention. The invention has been disclosed hereinabove with respect to

*Table III*

ENERGY REQUIREMENTS AND WHEEL EFFICIENCIES FOR GRINDING HARD BEAD CATALYST OF ABOUT 6-8 MESH SIZE

| Exp. No. | Pounds of dust produced per hour | Power, foot pounds per minute | | | Grinding efficiency, percent (power to produce new surface ÷ power delivered to grinding wheel) | Energy consumed per pound of dust, ft.-lbs./lb. (does not include frictional energy) | Calculated [1] dust particle size, microns | Observed [2] dust particle size, microns |
| --- | --- | --- | --- | --- | --- | --- | --- | --- |
| | | Delivered to grinding wheel | Converted to heat by friction | Consumed to produce new surface (by difference) | | | | |
| 1 | 0.32 | 7,000 | 4,600 | 2,400 | [3] 34 | 450,000 | 0.51 | From 0.2 to 1.0 micron averaging 0.5 micron. |
| 2 | 0.24 | 7,860 | 5,540 | 2,320 | [3] 30 | 583,000 | 0.39 | |
| 3 | 0.21 | 7,350 | 5,000 | 2,350 | [3] 32 | 672,000 | 0.34 | |
| 4 | 0.22 | 7,260 | 6,250 | 1,010 | [3] 14 | 275,000 | 0.83 | |
| 5 | 0.32 | 6,780 | 4,600 | 2,180 | [3] 32 | 409,000 | 0.56 | |
| 6 | 0.29 | 6,700 | 4,600 | 2,100 | [3] 31 | 431,000 | 0.53 | |
| 1 | 0.24 | 3,980 | 3,540 | 440 | [4] 11 | 110,000 | 2.1 | Average about 0.6–0.8 micron. |
| 2 | 0.11 | 6,850 | 2,930 | 3,920 | [4] 57 | 2,150,000 | 0.11 | |
| 3 | 0.17 | 4,440 | 3,450 | 990 | [4] 22 | 348,000 | 0.66 | |
| 4 | 0.10 | 1,910 | 1,190 | 720 | [4] 37 | 428,000 | 0.54 | |
| 1 | 0.71 | 4,200 | 3,370 | 830 | [5] 20 | 70,000 | 3.3 | Do. |
| 2 | 0.69 | 4,200 | 3,190 | 1,010 | [5] 24 | 88,000 | 2.6 | |

[1] Based on an energy consumption of 5.5 ft-lbs./ft.² of new surface as determined in bead breakage experiments.
[2] From optical and electron microscope observations.
[3] Wire brush wheel. [4] Soft iron disc wheel. [5] Hub and spoke "wheel."

Based on the data of Table III the dust produced by any of these wheels is seen to be of the order of 0.5 particular apparatus and tests conducted with this apparatus for purposes of illustration. The invention is not

I claim:

1. In a cracking system in which a particle-form cracking catalyst is passed through a reaction zone wherein it contacts hydrocarbons prepared for treatment and a regeneration zone wherein it contacts air for regeneration in an enclosed cyclic system, and wherein the surface layer of the catalyst becomes contaminated with a surface layer of metal contaminants detrimental to the desired conversion reaction, the method of restoring the catalyst activity which comprises: transferring metal contaminated catalyst to a reconditioning zone, maintaining said zone substantially filled with catalyst in touching contact, passing a gas upwardly through the mass of catalyst in said reconditioning zone, at an upward flow rate to just support said catalyst, mechanically rotating an agitating means in said mass of catalyst, at a speed high enough to effect the formation of a substantial amount of dust particles of less than 2 micron size, removing the dust particles as rapidly as formed from said reconditioning zone, and withdrawing the catalyst particles from said reconditioning zone after no more than about 1.0% of the catalyst has been removed as dust, said catalyst being in reconditioned form for reuse in the cracking system.

2. In a cracking system in which a particle-form cracking catalyst is passed in an enclosed system through a reaction zone wherein it contacts hydrocarbons prepared for treatment and a regeneration zone wherein it contacts air for regeneration, and wherein the surface layer of the catalyst becomes contaminated with metal contaminants detrimental to the desired conversion reaction, the method of restoring the catalyst activity which comprises: transferring metal contaminated catalyst to a reconditioning zone, maintaining said zone substantially filled with catalyst in touching contact, passing a gas upwardly through the mass of catalyst in said reconditioning zone, at an upward flow rate to just support said catalyst, mechanically rotating an agitating means in said mass of catalyst, at a speed high enough to effect the formation of dust particles of less than 1 micron size, removing the dust particles as rapidly as formed from said reconditioning zone, and withdrawing the catalyst particles from said reconditioning zone after no more than about 0.5% of the catalyst has been removed as dust, said catalyst being in reconditioned form for reuse in the cracking system.

3. The method of restoring a spent cracking catalyst containing excessive amounts of metal contaminants which comprises: introducing the spent catalyst into a reconditioning zone, maintaining a substantially compact mass of catalyst in said reconditioning zone occupying at least a substantial portion of the volume of said zone, passing a gas upwardly through the bed of catalyst in said zone at a flow rate which provides a pressure drop across said catalyst mass substantially equal to the head of catalyst in said zone, rotating a stirring member within said zone of sufficient size and at a sufficient speed to effect the continuous formation of dust of a particle size smaller than about 2 microns, withdrawing the dust continuously from said zone with the rising gas, and maintaining the catalyst in said zone until a layer of catalyst is removed from each catalyst particle not more than about 5 microns thick and then withdrawing the reconditioned catalyst from said reconditioning zone.

4. In a cracking system in which catalyst of about 40–100 micron size is maintained in ebullient motion in reaction and regeneration zones by the upward flow of hydrocarbon vapors and air respectively and is transferred from the reaction zone to the regeneration zone and from the regeneration zone to the reaction zone, and wherein metal particles from the hydrocarbons deposit on the outer layer of the catalysts, the improved method of restoring the catalyst which comprises: withdrawing a side stream of the catalyst and introducing the catalyst into a reconditioning zone, maintaining a substantially compact mass of catalyst in said reconditioning zone occupying at least a substantial portion of the volume of said zone, passing gas upwardly through the bed of catalyst in said zone at a flow rate which provides a pressure drop across said catalyst mass substantially equal to the head of catalyst in said zone, rotating a stirring member within said zone of sufficient size and at sufficient speed to effect the continuous formation of dust of a particle size smaller than about 2 microns, withdrawing the dust continuously from said reconditioning zone with the rising gas, and maintaining the catalyst in said zone until a layer of catalyst is removed from each catalyst particle not more than about 5 microns thick and then withdrawing the reconditioned catalyst from said reconditioning zone and returning the reconditioned catalyst to the main cracking system.

5. In a cracking system in which catalyst of about 0.10–0.14 inch size is maintained in continuous gravitating motion through reaction and regeneration zone and transferred from the bottom of the reaction zone to the top of the regeneration zone and from the bottom of the regeneration zone to the top of the reaction zone, and wherein the catalyst is contacted with hydrocarbons in the reaction zone and air in the regeneration zone and wherein metal particles from the hydrocarbons deposit on the outer layer of the catalyst, the improved method of restoring the catalyst which comprises: withdrawing a side stream of the catalyst and introducing the catalyst into a reconditioning zone, maintaining a substantially compact mass of catalyst in said reconditioning zone occupying at least a substantial portion of the volume of said zone, passing gas upwardly through the bed of catalyst in said zone at a flow rate which provides a pressure drop across said catalyst mass substantially equal to the head of catalyst in said zone, rotating a stirring member within said zone of sufficient size and at sufficient speed to effect the continuous formation of dust of a particle size smaller than about 2 microns, withdrawing the dust continuously from said reconditioning zone with the rising gas, and maintaining the catalyst in said zone until a layer of catalyst is removed from each catalyst particle not more than about 5 microns thick and then withdrawing the reconditioned catalyst from said reconditioning zone and returning the reconditioned catalyst to the main cracking system.

References Cited in the file of this patent

UNITED STATES PATENTS

| | | |
|---|---|---|
| 1,412,219 | Richardson | Apr. 11, 1922 |
| 2,271,743 | Nagy | Feb. 3, 1942 |
| 2,453,592 | Putney | Nov. 9, 1948 |
| 2,605,234 | Friedman | July 29, 1952 |
| 2,607,173 | Garrison | Aug. 19, 1952 |
| 2,856,273 | Beber et al. | Oct. 14, 1958 |
| 2,892,771 | Milliken | June 30, 1959 |
| 2,958,650 | Dart et al. | Nov. 1, 1960 |

UNITED STATES PATENT OFFICE
CERTIFICATE OF CORRECTION

Patent No. 3,060,117                      October 23, 1962

John W. Payne

It is hereby certified that error appears in the above numbered patent requiring correction and that the said Letters Patent should read as corrected below.

Column 5, line 8, after "desirable" insert -- to operate --.

Signed and sealed this 2nd day of April 1963.

(SEAL)
Attest:

ESTON G. JOHNSON

Attesting Officer

DAVID L. LADD

Commissioner of Patents